United States Patent
Duong et al.

(10) Patent No.: US 10,570,925 B2
(45) Date of Patent: Feb. 25, 2020

(54) DIFFUSER PIPE WITH SPLITTER VANE

(71) Applicant: Pratt & Whitney Canada Corp., Longueuil (CA)

(72) Inventors: Hien Duong, Mississauga (CA); Vijay Kandasamy, T. Palur (IN); Koundinya Upadrasta, Vuyyur Mandal (IN)

(73) Assignee: PRATT & WHITNEY CANADA CORP., Longueuil (CA)

( * ) Notice: Subject to any disclaimer, the term of this patent is extended or adjusted under 35 U.S.C. 154(b) by 1126 days.

(21) Appl. No.: 14/924,082

(22) Filed: Oct. 27, 2015

(65) Prior Publication Data

US 2017/0114797 A1   Apr. 27, 2017

(51) Int. Cl.
*F04D 29/54* (2006.01)

(52) U.S. Cl.
CPC .................. *F04D 29/547* (2013.01)

(58) Field of Classification Search
CPC .. F04D 29/44; F04D 27/0207; F04D 27/0215; F04D 27/023; F04D 27/0238; F04D 29/547; F04D 29/441; F02C 3/08; F05D 2250/324; F05D 2220/3219
USPC ....................................................... 415/208.3
See application file for complete search history.

(56) References Cited

U.S. PATENT DOCUMENTS

| | | | |
|---|---|---|---|
| 1,662,249 A | 3/1928 | Jennings | |
| 2,419,669 A | 4/1947 | Birmann | |
| 2,662,553 A | * 12/1953 | Dimmock | F15D 1/04 138/37 |
| 3,006,145 A | 10/1961 | Sobey | |
| 3,333,762 A | 8/1967 | Vrana | |
| 3,420,435 A | 1/1969 | Jarosz et al. | |
| 3,613,360 A | 10/1971 | Howes | |
| 3,652,176 A | 3/1972 | Walsh | |
| 3,706,510 A | 12/1972 | O'Connor | |
| 3,768,919 A | 10/1973 | O'Connor | |
| 3,832,089 A | 8/1974 | Moellmann | |
| 3,856,430 A | 12/1974 | Langham | |
| 3,879,939 A | 4/1975 | Markowski | |
| 3,935,034 A | 1/1976 | Hayes | |
| 3,964,837 A | 6/1976 | Exley | |
| 3,971,218 A | 7/1976 | Toth, Jr. et al. | |
| 4,019,537 A | * 4/1977 | Bonnard | F01D 25/30 138/37 |
| 4,054,398 A | 10/1977 | Penny | |

(Continued)

FOREIGN PATENT DOCUMENTS

| | | |
|---|---|---|
| EP | 1507977 | 2/2005 |
| FR | 1603204 | 3/1971 |

(Continued)

*Primary Examiner* — Eldon T Brockman
(74) *Attorney, Agent, or Firm* — Norton Rose Fulbright Canada LLP

(57) ABSTRACT

A compressor diffuser for a gas turbine engine includes one or more diffuser pipes having a tubular body defining an internal flow passage extending therethrough. The tubular body includes a first portion extending in a first direction, a second portion extending in a second direction different from the first direction, and a curved portion fluidly linking the first portion and the second portion. A splitter vane is disposed within the internal flow passage of the curved portion of the tubular body, the splitter vane defining a convergent flow passage between itself and a radially inner wall of the curved portion.

14 Claims, 7 Drawing Sheets

(56) References Cited

U.S. PATENT DOCUMENTS

| | | | |
|---|---|---|---|
| 4,131,389 | A | 12/1978 | Perrone et al. |
| 4,164,845 | A | 8/1979 | Exley et al. |
| 4,212,585 | A | 7/1980 | Swarden et al. |
| 4,264,271 | A | 4/1981 | Libertini |
| 4,308,718 | A | 1/1982 | Mowill |
| 4,315,714 | A | 2/1982 | Exley et al. |
| 4,349,314 | A | 9/1982 | Erwin |
| 4,368,005 | A | 1/1983 | Exley et al. |
| 4,395,197 | A | 7/1983 | Yoshinaga et al. |
| 4,402,764 | A | 9/1983 | Clark et al. |
| 4,445,816 | A | 5/1984 | Ribaud et al. |
| 4,576,550 | A | 3/1986 | Bryans |
| 4,687,412 | A | 8/1987 | Chamberlain |
| 4,740,138 | A | 4/1988 | Zaehring et al. |
| 4,832,993 | A | 5/1989 | Coulon |
| 4,919,773 | A | 4/1990 | Naik |
| 4,989,807 | A | 2/1991 | Foreman et al. |
| 5,064,691 | A | 11/1991 | Kirner et al. |
| 5,228,832 | A | 7/1993 | Nishida et al. |
| 5,252,027 | A | 10/1993 | Brasz |
| 5,327,940 | A | 7/1994 | Presz, Jr. |
| 5,372,477 | A | 12/1994 | Cole |
| 5,427,498 | A | 6/1995 | Lehe et al. |
| 5,461,860 | A | 10/1995 | Schegk |
| 5,478,200 | A | 12/1995 | Broderson et al. |
| 5,564,898 | A | 10/1996 | Richards et al. |
| 5,601,406 | A | 2/1997 | Chan et al. |
| 5,618,162 | A | 4/1997 | Chan et al. |
| 5,876,572 | A | 3/1999 | Rickerby et al. |
| 6,155,777 | A | 12/2000 | Aschenbruck et al. |
| 6,166,462 | A | 12/2000 | Finkenbinder et al. |
| 6,209,312 | B1 | 4/2001 | Singer et al. |
| 6,210,104 | B1 | 4/2001 | Schonenborn |
| 6,220,816 | B1 | 4/2001 | Nguyen Duc et al. |
| 6,224,321 | B1 | 5/2001 | Ebden et al. |
| 6,279,322 | B1 | 8/2001 | Moussa |
| 6,471,475 | B1 | 10/2002 | Sasu et al. |
| 6,478,887 | B1 | 11/2002 | Sue et al. |
| 6,589,015 | B1 | 7/2003 | Roberts et al. |
| 6,605,160 | B2 | 8/2003 | Hoskin |
| 6,695,579 | B2 | 2/2004 | Meng |
| 6,699,008 | B2 | 3/2004 | Japikse |
| 6,706,319 | B2 | 3/2004 | Seth et al. |
| 6,729,843 | B1 | 5/2004 | Nichtawitz et al. |
| 6,797,335 | B1 | 9/2004 | Paderov et al. |
| 7,032,383 | B2 * | 4/2006 | Weber ............ F02B 33/40 138/37 |
| 7,326,027 | B1 | 2/2008 | Skoch et al. |
| 7,553,122 | B2 * | 6/2009 | Kirtley ............ F04D 17/122 415/1 |
| 8,012,724 | B2 | 9/2011 | Holm et al. |
| 8,021,104 | B2 | 9/2011 | Gu et al. |
| 8,122,724 | B2 * | 2/2012 | Slovisky ......... F04D 27/0238 60/772 |
| 8,235,648 | B2 | 8/2012 | LeBlanc |
| 8,257,036 | B2 | 9/2012 | Norris |
| 8,287,232 | B2 | 10/2012 | Gu et al. |
| 9,926,942 | B2 * | 3/2018 | Duong ............ F04D 29/441 |
| 2002/0114693 | A1 | 8/2002 | Batholoma et al. |
| 2005/0050889 | A1 * | 3/2005 | Weber ............ F02B 33/40 60/612 |
| 2005/0118019 | A1 | 6/2005 | Roberts et al. |
| 2006/0045772 | A1 * | 3/2006 | Slovisky ......... F04D 27/0238 417/423.1 |
| 2007/0147987 | A1 * | 6/2007 | Kirtley ............ F04D 17/122 415/169.1 |
| 2009/0238677 | A1 * | 9/2009 | Clemen ........... F04D 27/0215 415/52.1 |
| 2012/0128475 | A1 | 5/2012 | Bailey |
| 2015/0226232 | A1 | 8/2015 | Duong |
| 2016/0115971 | A1 * | 4/2016 | Duong ............ F04D 29/444 60/751 |
| 2017/0114794 | A1 * | 4/2017 | Duong ............ F04D 29/441 |
| 2018/0180059 | A1 * | 6/2018 | Duong ............ F04D 29/441 |

FOREIGN PATENT DOCUMENTS

| | | | |
|---|---|---|---|
| GB | 170815 | 10/1921 | |
| GB | 702773 A * | 1/1954 | ........... F04D 29/441 |
| JP | S569696 | 1/1981 | |
| JP | 01257797 | 10/1989 | |
| JP | 2011220125 | 11/2011 | |
| WO | 0034628 | 6/2000 | |
| WO | 0206676 | 1/2002 | |
| WO | 2012060825 | 5/2012 | |
| WO | 2012166858 | 12/2012 | |
| WO | 2013084525 | 6/2013 | |

\* cited by examiner

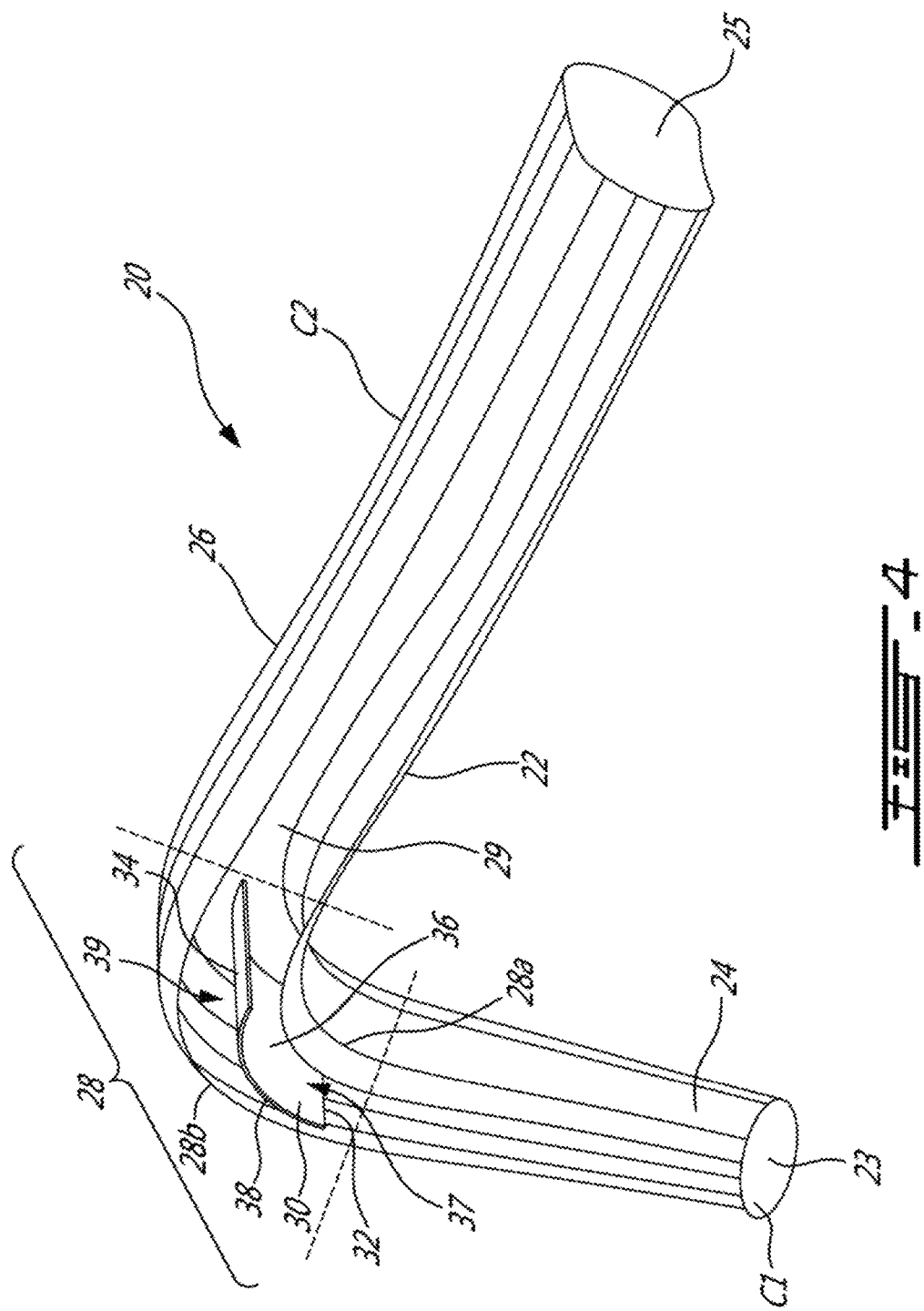

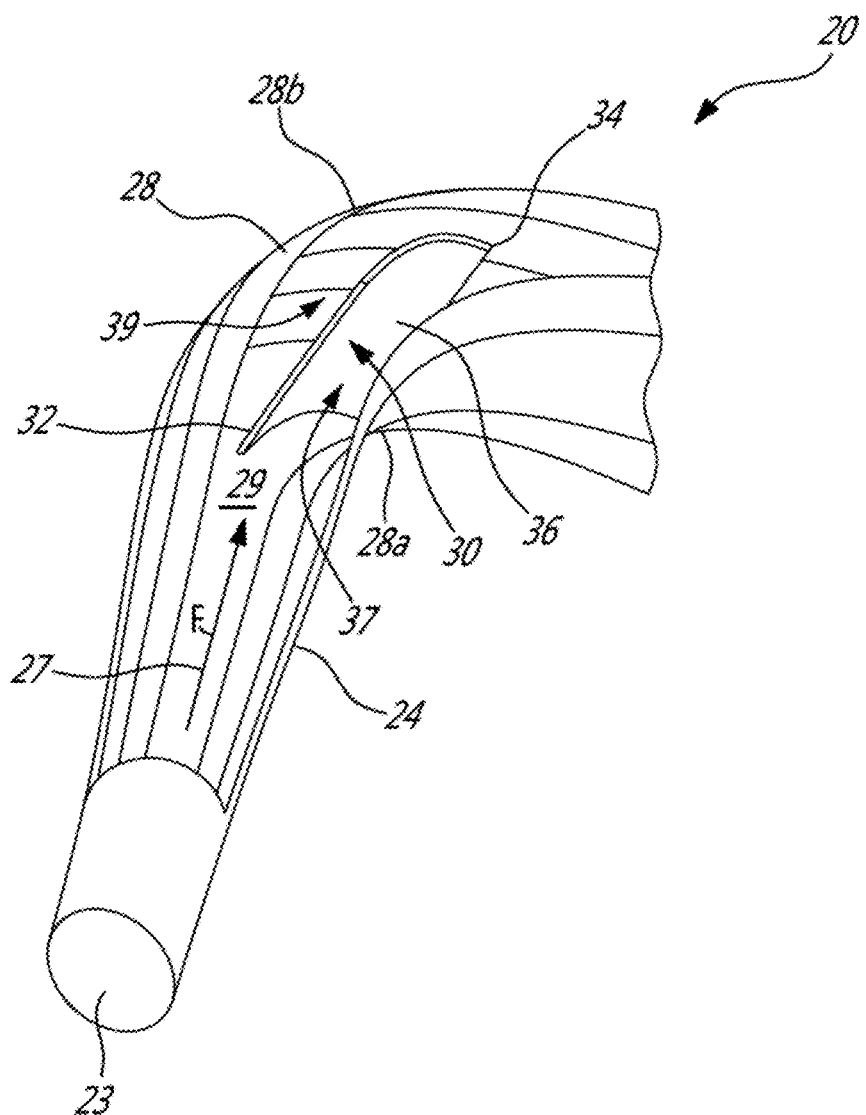

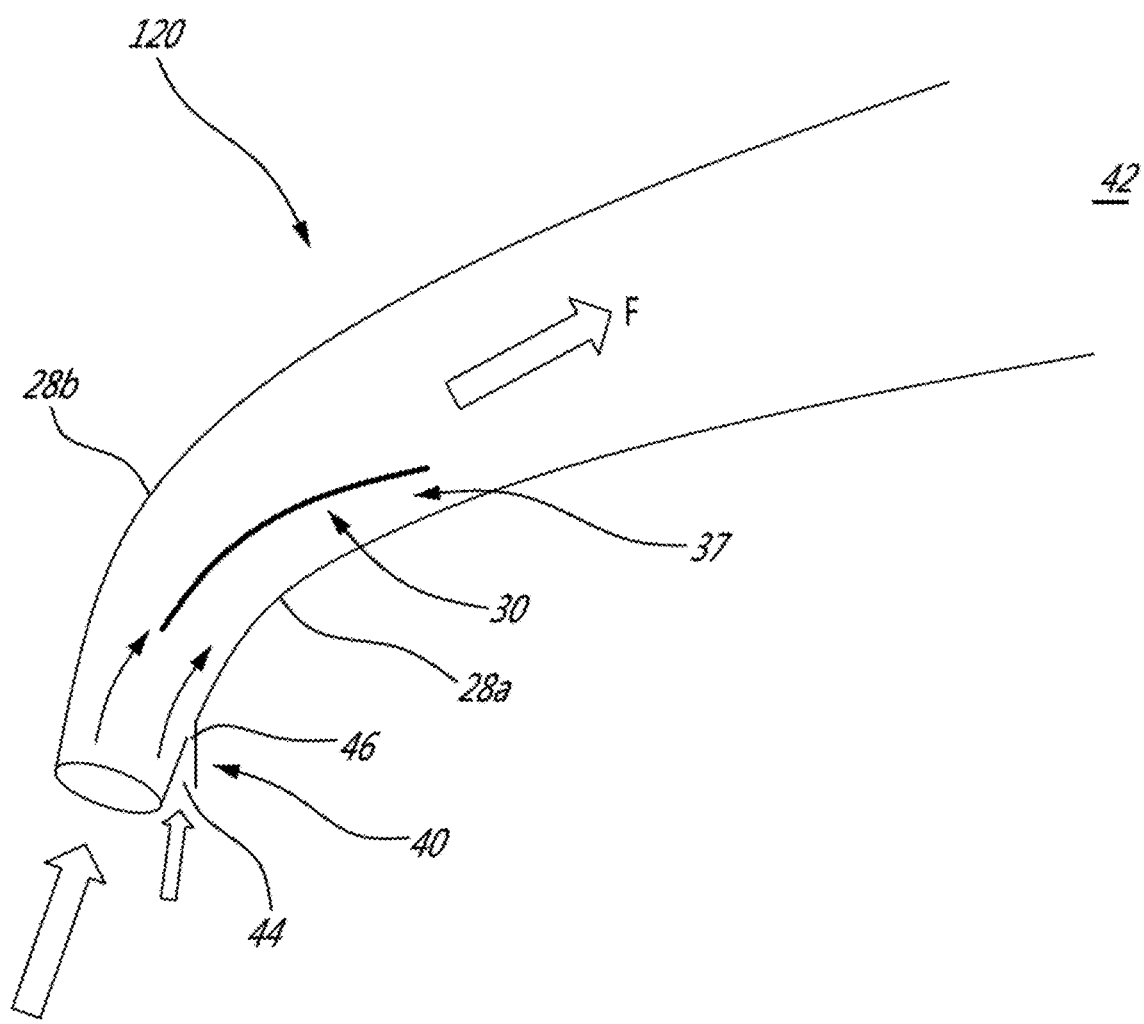

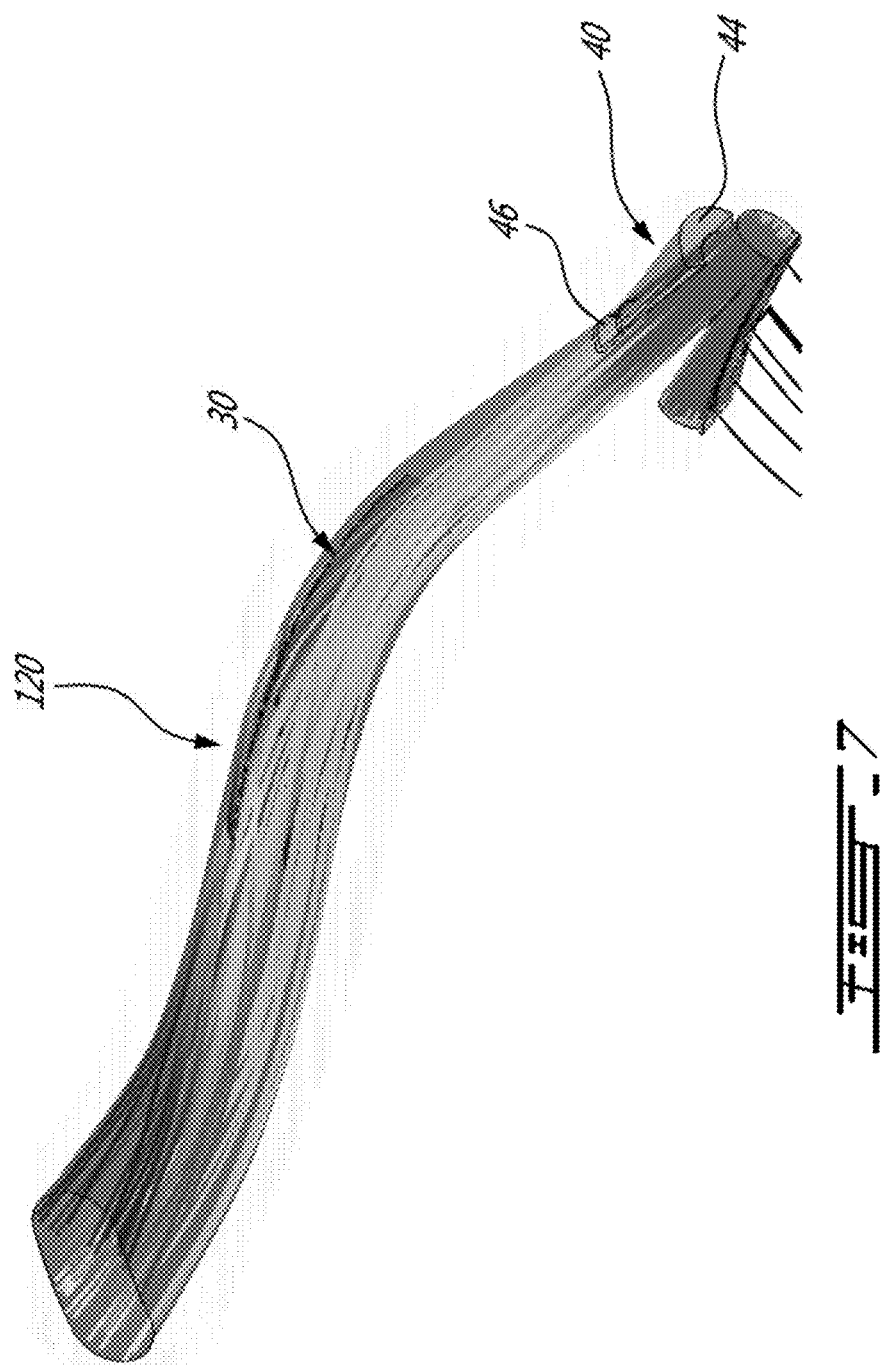

DIFFUSER PIPE WITH SPLITTER VANE

TECHNICAL FIELD

The application relates generally to gas turbine engines and, more particularly, to compressor diffusers therefore.

BACKGROUND

Diffuser pipes are provided in certain gas turbine engines for directing flow of compressed air from an impeller of a centrifugal compressor to an annular chamber containing the combustor, while diffusing the high speed air. The diffuser pipes are typically circumferentially arranged at a periphery of the impeller, and are designed to transform kinetic energy of the flow into pressure energy. Diffuser pipes may provide a uniform exit flow with minimal distortion, as it is preferable for flame stability, low combustor loss, reduced hot spots etc.

While longer diffuser pipes may accomplish better diffusion, spatial constraints of the gas turbine engine may restrict their length. Large flow diffusion in diffuser pipes over insufficient pipe length may result in thick and weak boundary layer buildup on the wall of the diffuser pipe. To compensate for a shorter length, many diffuser pipes have a tight bend. Turbulence and other non-streamline behavior of the flow at the bend may lead to pressure losses and decrease efficiency of the diffuser pipe, and therefore of the compressor.

SUMMARY

There is therefore provided a compressor diffuser for a gas turbine engine comprising: at least one diffuser pipe having a tubular body defining an internal flow passage extending therethrough, the tubular body including a first portion extending in a first direction, a second portion extending in a second direction different from the first direction, and a curved portion fluidly linking the first portion and the second portion; and a splitter vane disposed within the internal flow passage of the curved portion of the tubular body, the splitter vane defining a convergent flow passage between itself and a radially inner wall of the curved portion.

There is also provided a method for diffusing fluid flow in a compressor, comprising: conveying fluid flow through a diverging internal flow passage of a compressor diffuser, the internal flow passage including at least one curved portion; splitting the fluid flow into first and second fluid passages defined within the internal flow passage, the first and second fluid passages being at least partially located within the curved portion; and converging fluid flow through the first fluid passage.

There is further provided a centrifugal compressor, comprising: an impeller having an inner hub with a plurality of vanes extending therefrom, the impeller being rotatable within an outer shroud about a central longitudinal axis, the impeller having a radial impeller outlet; and a diffuser configured to diffuse gas received from the impeller outlet, the diffuser comprising: at least one diffuser pipe having a tubular body defining a flow passage extending therethrough, the tubular body including a first portion extending in a first direction, a second portion extending in a second direction different from the first direction, and a curved portion fluidly linking the first portion and the second portion; and a splitter vane disposed within the internal flow passage of the curved portion of the tubular body, the splitter vane defining a convergent flow passage between itself and a radially inner wall of the curved portion.

There is alternately provided a compressor diffuser for a gas turbine engine comprising: a plurality of diffuser pipes each having a diverging tubular body defining a flow passage extending fully therethrough, the tubular body including a first portion extending in a first direction, a second portion extending in a second direction different from the first direction, and a curved portion interconnecting the first portion and the second portion; and a plurality of splitter vanes each extending into the flow passage of a corresponding diffuser pipe and disposed at least partially within the curved portion between an inner and an outer wall thereof, the splitter vane extending a length between a leading edge and a trailing edge, a first side of the splitter vane converging along the length toward one of the inner and outer walls, and an opposed second side of the splitter vane diverging along the length away from the other one of the inner and outer walls.

There is alternately provided a method for diffusing fluid flow, comprising: conveying fluid flow through a diverging tubular body having a first portion extending in a first direction, a second portion extending in a second direction different from the first direction, and a curved portion interconnecting the first portion and the second portion; splitting fluid flow at the curved portion of the tubular body into a first fluid passage and a second fluid passage; and converging fluid flow through the first fluid passage, and diffusing fluid flow through the second fluid passage.

There is alternately provided a centrifugal compressor, comprising: an impeller having an inner hub with vanes thereon and rotatable within an outer shroud about a central longitudinal axis, the impeller having a radial impeller outlet; and a diffuser operable to diffuse gases received from the impeller outlet, the diffuser comprising: a plurality of diffuser pipes each having a diverging tubular body defining a flow passage extending fully therethrough, the tubular body including a first portion extending in a first direction, a second portion extending in a second direction different from the first direction, and a curved portion interconnecting the first portion and the second portion; and a splitter vane extending into the flow passage and disposed at least partially within the curved portion between an inner and an outer wall thereof, the splitter vane extending a length between a leading edge and a trailing edge, a first side of the splitter vane converging along the length toward one of the inner and outer walls, and an opposed second side of the splitter vane diverging along the length away from the other one of the inner and outer walls.

DESCRIPTION OF THE DRAWINGS

Reference is now made to the accompanying figures in which:

FIG. 4 is a partially sectioned perspective view of the diffuser pipe of FIG. 3;

FIG. 5 is a detailed, partially sectioned, perspective view of the diffuser pipe of FIG. 3;

FIG. 6 is a schematic cross-sectional view of a diffuser pipe having a splitter vane and an air recirculation conduit, according to another embodiment of the present disclosure; and FIG. 7 is a side elevation view of the diffuser pipe of FIG. 3, shown at least partially transparent with shading to illustrate streamlines of fluid flow therethrough.

DETAILED DESCRIPTION

Figure 1:
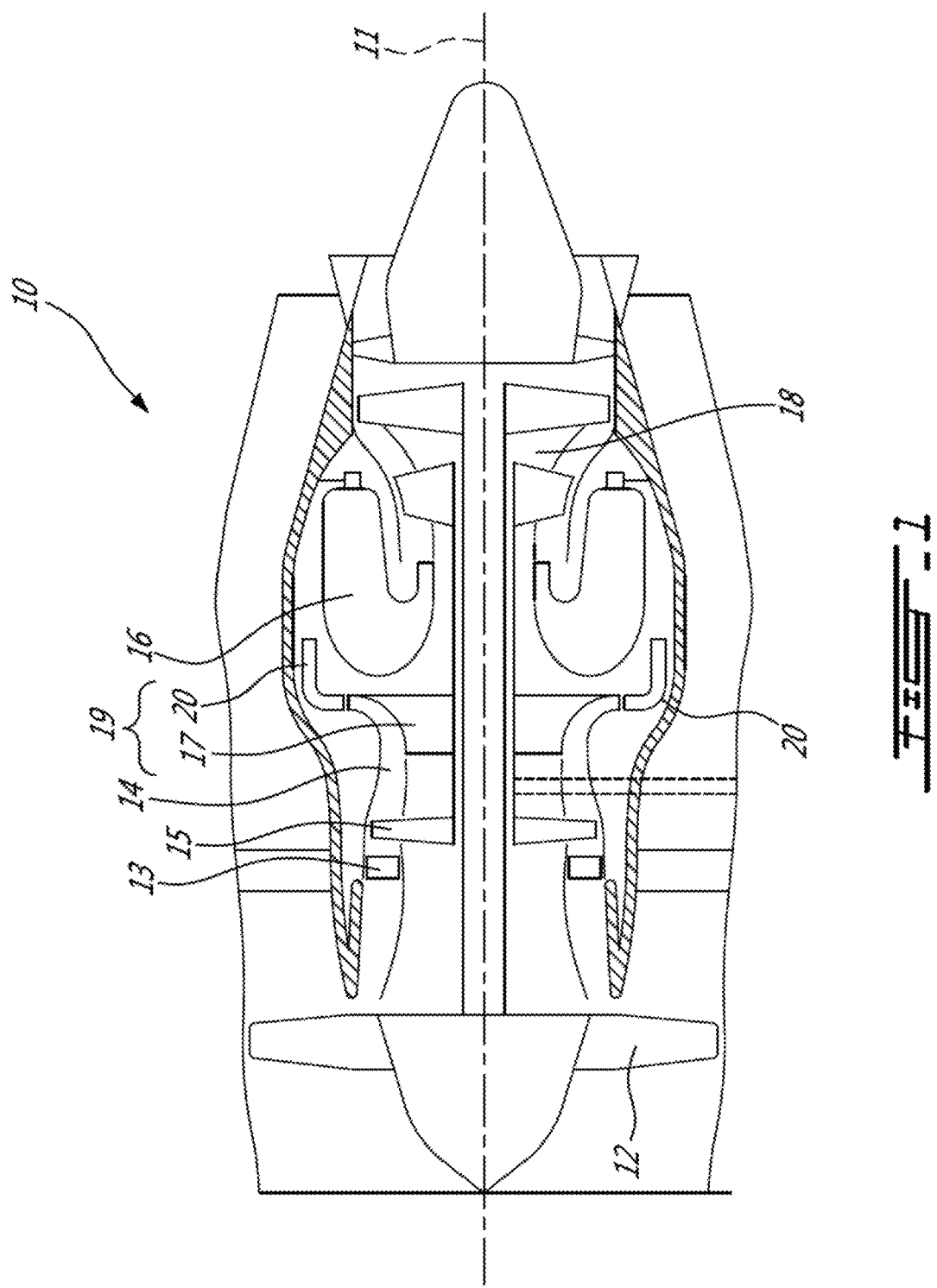
FIG. 1 is a cross-sectional view of a gas turbine engine.

FIG. 1 illustrates a gas turbine engine 10 of a type preferably provided for use in subsonic flight, generally comprising in serial flow communication along an engine axis 11: a fan 12 through which ambient air is propelled, a compressor section 14 for pressurizing the air, a combustor 16 in which the compressed air is mixed with fuel and ignited for generating an annular stream of hot combustion gases, and a turbine section 18 for extracting energy from the combustion gases. The compressor section 14 may include a plurality of stators 13 and rotors 15 (only one stator 13 and rotor 15 being shown in FIG. 1), and it may include a centrifugal compressor 19.

The centrifugal compressor 19 of the compressor section 14 includes an impeller 17 and a plurality of diffuser pipes 20, which are located downstream of the impeller 17 and circumferentially disposed about a periphery of the exit of the impeller 17. The diffuser pipes 20 convert high kinetic energy at the impeller 17 exit to static pressure by slowing down fluid flow exiting the impeller. The diffuser pipes 20 may also redirect the air flow from a radial orientation to an axial orientation (i.e. aligned with the engine axis 11). In most cases, the Mach number of the flow entering the diffuser pipe 20 may be at or near sonic, while the Mach number exiting the diffuser pipe 20 may be in the range of 0.2-0.25 to enable stable air/fuel mixing, and light/re-light in the combustor 16.

Figure 2:
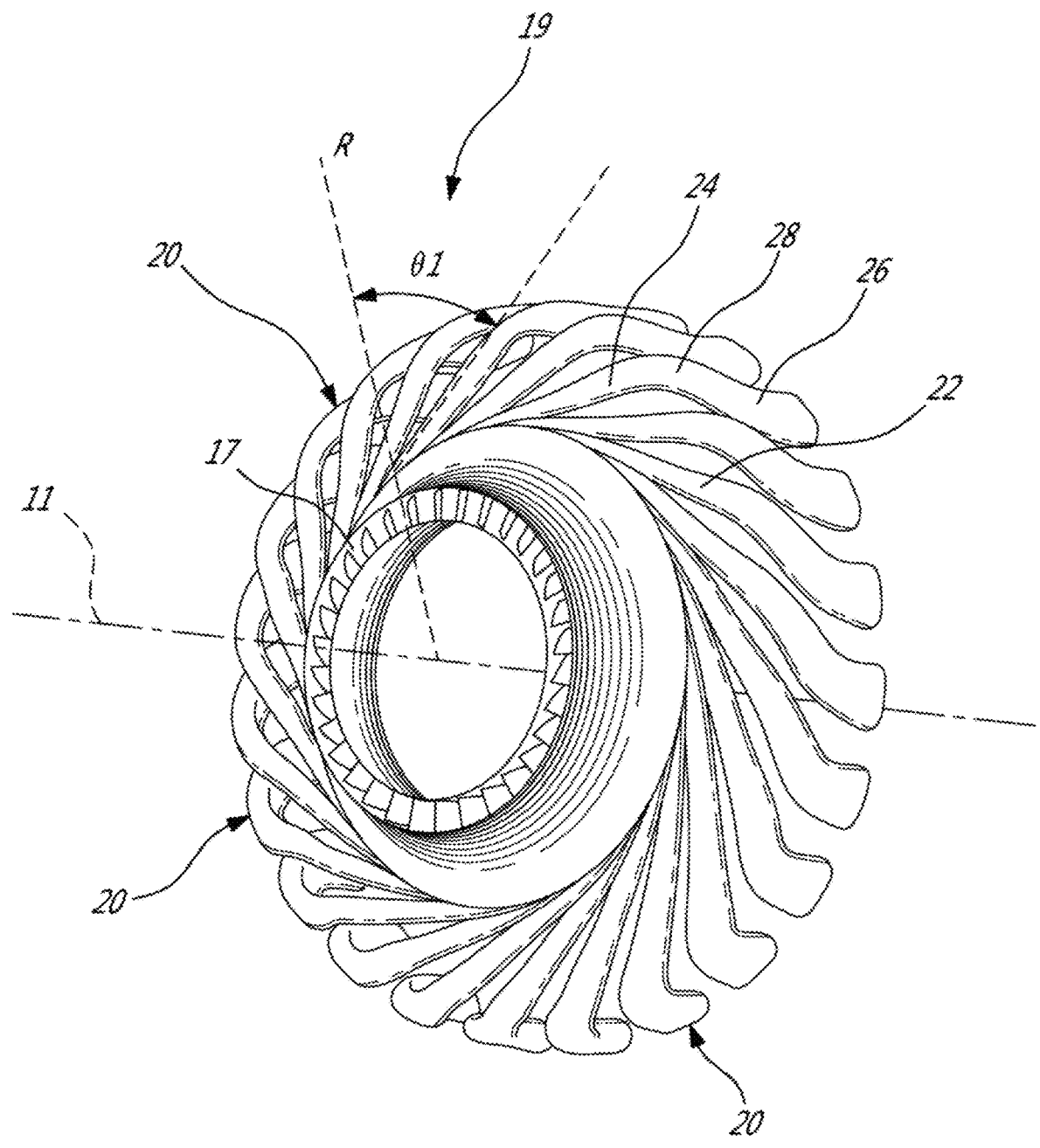
FIG. 2 is a perspective view of an impeller and a corresponding plurality of radially disposed diffuser pipes of a centrifugal compressor for a gas turbine as shown in FIG. 1.

Turning now to FIG. 2, the impeller 17 and the plurality of diffuser pipes 20, also referred to as "fishtail diffuser pipes", of the centrifugal compressor 19 are more clearly seen. Each of the diffuser pipes 20 includes a diverging (in a downstream direction) tubular body 22, formed, in one embodiment, of sheet metal. The enclosed tubular body 22 defines a flow passage extending the length of the diffuser pipe 20 through which the compressed fluid flow is conveyed. The tubular body 22 includes a first portion 24 extending generally tangentially from the periphery of the impeller 17. An open end is provided at an upstream end of the tubular body 22 and forms an inlet of the diffuser pipe 20. The first portion 24 is inclined at an angle θ1 relative to a radial axis R. The angle θ1 may be at least partially tangential, or even substantially tangentially, and may further correspond to a direction of fluid flow at the exit of the blades of the impeller 17, such as to facilitate transition of the flow from the impeller 17 to the diffuser pipes 20. The first portion 24 of the tubular body 22 can alternatively extend more substantially along the radial axis R.

The tubular body 22 of the diffuser pipes 20 also includes a second portion 26, which is disposed generally axially and is connected to the first portion 24 by an out-of-plane curved portion 28 or "bend". An open end at the downstream end of the second portion 26 forms an outlet of the diffuser pipe 20. Preferably, but not necessarily, the first portion 24 and the second portion 26 of the diffuser pipes 20 are integrally formed together and extend substantially uninterrupted between each other, via the curved, bend, portion 28.

The large swirl of the flow exiting the impeller 17, and therefore entering the first portion 24 of each of the diffuser pipes 20, may be removed by shaping the diffuser pipe 20 with the curved portion 28, such that the flow is redirected axially before exiting to the combustor 16. For a given impeller 17 exit Mach number and swirl of the flow, the effectiveness of a diffuser pipe may be dependent upon its length. For a fishtail pipe type diffuser, such as the one described herein, the greater its length the easier it is for the pipe to diffuse flow efficiently without, or with only minimal, flow separation at the curved portion 28. Effective length can be obtained by extending the pipe radially, axially, or both. Longer diffuser pipes are however less desirable, in that they may potentially increase both the weight and the size of the engine. In addition, a required gap between the outlet of each diffuser pipe 20 and the location of the combustor fuel nozzles is another constraint that may place physical restrictions on radial/axial extension of the diffuser pipes 20. As a result, the diffuser pipe 20 may be designed to have a tight 90 degree bend 28 to compensate for its reduced length.

Figure 3:
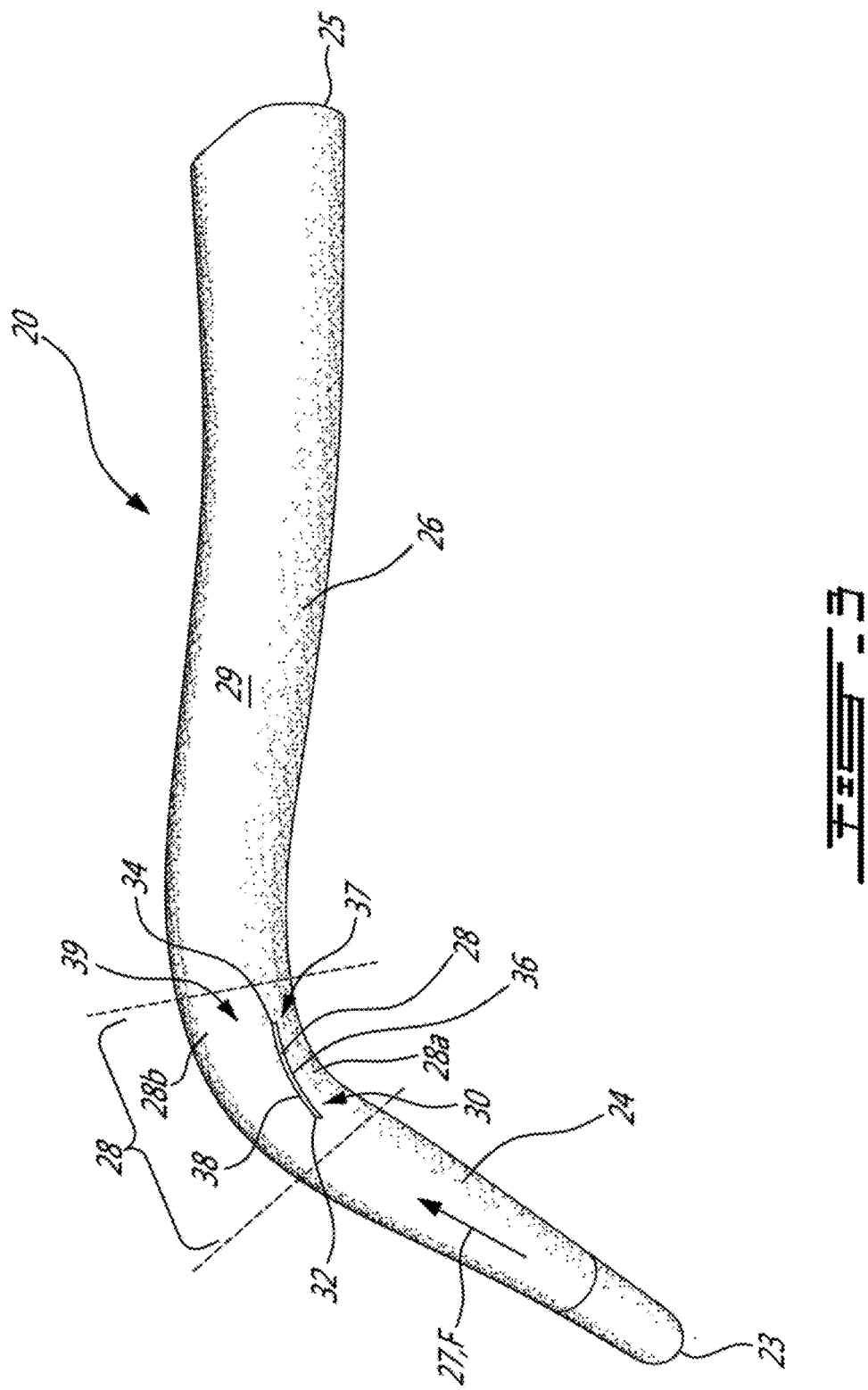
FIG. 3 is a perspective view of a diffuser pipe of the compressor of FIG. 2 having a splitter vane, according to an embodiment of the present disclosure.

Referring now to FIG. 3, the tubular body 22 of each diffuser pipe 20 has a radially inner wall 28a and a radially outer wall 28b, which meet to form an enclosed fluid passage 29 extending through the length of the tubular body 22. The radially inner wall 28a corresponds to the wall of the tubular body 22 that has the smallest turning radius at the curved portion 28, whereas the radially outer wall 28b corresponds to the wall of the tubular body 22 that has the largest turning radius at the curved portion 28.

As noted above, and as can be seen in FIG. 3, the tubular body 22 diverges in the direction 27 of fluid flow F therethrough, in that the internal fluid passage 29 defined within the tubular body 22 increases in cross-sectional area along its length which extends between an inlet 23 and an outlet 25 thereof. This increase in cross-sectional area of the internal fluid passage 29 through each diffuser pipe 20 may be continuous along the complete length of the tubular body 22 or the cross-sectional area of the internal passage may increase in gradual increments along the tube length. In the depicted embodiment, the cross-sectional area of the inner fluid passage 29 defined within the tubular body 22 increases gradually and continuously along its length, from the inlet 23 to the outlet 25. The first portion 24 may have a generally circular cross-sectional shape, while the second portion 26 may have a flattened oval (or oblong) cross-sectional shape. Other types of cross-sections for the first portion 24 and the second portion 26 are however also within the scope of the present disclosure.

Still referring now to FIG. 3, each of the diffuser pipes 20 includes an internal airfoil shaped flow guide or splitter vane 30 (hereinafter simply "splitter vane"), disposed within the internal fluid passage 29 and extending between opposed inner side walls of the tubular body 22. The splitter vane 30 is disposed within the internal fluid passage 29 at a lengthwise point between the inlet 23 and the outlet 25 of the tubular body 22 forming the diffuser pipe 20, although as seen in FIG. 3, in the depicted embodiment the splitter vane 30 is located at or near an intermediate point in the diffuser pipe 20 within the bend 28.

The splitter vane 30 is oriented in the diffuser pipe 20 so that a leading edge 32 of the splitter vane 30 receives the incoming fluid flow F, and in at least the present embodiment the airfoil-shaped splitter vane 30 curves in a same direction as the curved bend portion 28 of the diffuser pipe 20. The splitter vane 30 is generally disposed to conform to the fluid flow F (i.e. streamlined) so that there is minimal separation when the fluid flow F encounters the splitter vane 30. The splitter vane 30 divides, or "splits", incoming fluid flow F within the upstream portion of internal fluid passage 29 into two separate flow passages over the length of the splitter vane 30.

As noted, the splitter vane 30 in the present embodiment is disposed within the internal flow passage 29 within the curved or bent portion 28 of the diffuser pipe 20. The curved portion 28 may be defined by a zone of redirection between the first portion 24 and the second portion 26 of the pipe, as illustrated by the two dotted lines joined by the bracket 28 in FIG. 3. The splitter vane 30 may however only be partially disposed within this curved portion 28, and therefore may also extend, at least partially, into the first and/or the second portion 24, 26 of the diffuser pipe 20. In one embodiment, a majority of the total length of the splitter vane 30 is disposed within this redirection zone 28 defined at the curved portion 28 of the diffuser pipe. In the embodiment of FIG. 3, the entirety of the length of the splitter vane 30 is disposed within this redirection zone 28 defined at the curved portion 28 of the diffuser pipe 20. The presence of the splitter vane 30 may at least reduce some of the drawbacks associated with the tight bend of the curved portion 28, as noted below.

It has been found that the curvature of the curved portion 28 of the diffuser pipe 20 may cause the flow to detach from the internal surfaces of the inner and/or outer walls 28a, 28b, which can result in pressure losses and non-uniform flow at the outlet 25 of the diffuser pipe 20. Mixing losses may also occur and negative effect overall diffuser performance. Such flow separation in the diffuser pipe, beginning at the curved portion, may not only be potentially detrimental to the performance and operability of the compressor section, but also to its structural integrity as flow separation can be destructive in nature and can lead to premature pipe breakage, fatigue, cracking, noise, flame instability etc.

In order to at least partially help address these issues, the presence of the splitter vane 30 in the diffuser pipe 20 of the present disclosure may relieve the pressure gradient at the curved portion 28, and therefore reduce the occurrence of flow separation downstream of the curved portion of the pipe. This may accordingly help reduce aerodynamic pipe loses and may therefore contribute to improved overall compressor performance (e.g. stall enhancement, improved surge margin) and range. While it is possible that the splitter vane 30 may cause some small additional amount of aerodynamic friction loss, the reduction in overall mixing losses enabled by the splitter vane 30 may more than offset this increase in friction loss.

Still referring to FIG. 3, the splitter vane 30 of the present diffuser pipe 30 is airfoil shaped and includes a leading edge 32 and a trailing edge 34. The extent of the splitter vane 30 between its leading and trailing edges 32,34 defines its length. The splitter vane 30 has a first side 36 and an opposite second side 38, each of which faces one of the inner and outer walls 28a,28b of the tubular body 22. The descriptors "first" and "second" do not limit the sides 36,38 to the particular configuration shown in the figures. It will be appreciated that the first side 36 may face either one of the inner and outer walls 28a,28b, and that the second side can similarly face either one of the inner and outer walls 28a,28b. For the sole purpose of facilitating understanding, the first side 36 will be described herein as a "convergent" side where fluid flow is converged over the length of the splitter vane 30, and the second side 38 will be described as a "divergent" or "diffusing" side where fluid flow is diverged over the length of the splitter vane 30. It will however be understood that the second side 38 can instead be the "convergent" side while the first side 36 can be the "divergent" side, without departing from the scope of the present disclosure.

The first side 36 of the splitter vane 30 faces toward either one of the inner and outer walls 28a,28b in order to form a convergent flow passage 37 in which fluid flow converges, over the length of the splitter vane 30 in the direction 27 of fluid flow F, toward the corresponding inner or outer wall 28a,28b. In the embodiment shown in FIG. 3, the first side 36 converges towards the inner wall 28a, thereby forming the convergent flow passage 37 within the internal flow passage 29 of tubular body 22 at the curved portion 28. The convergent flow passage 37 may be defined between the first side 36 and the inner wall 28a of the tubular body 22, over the length of the splitter vane 30 between its leading and trailing edges 32,34. This convergent flow passage 37 becomes narrower over the length of the splitter vane 30, in the direction 27 of fluid flow F, because the cross-sectional area of the convergent flow passage 37 decreases from the inlet of the convergent flow passage 37 to its outlet (i.e. defined at the leading edge 32 and the trailing edge 34 of the splitter vane 30).

The second side 38 faces toward either one of the inner and outer walls 28a,28b, in order to diverge fluid flow within the divergent flow passage 39 defined between the second side 38 of the splitter vane and the facing wall of the tubular body 22, and this over the length of the splitter vane 30. In the embodiment shown in FIG. 3, the second side 38 of the splitter vane 30 diverges away from the outer wall 28b, thereby diffusing fluid flow through this divergent flow passage 39. The second side 38 therefore defines the divergent flow passage 39 within the tubular body 22 at the curved portion 28. The divergent flow passage 39 may be defined between the second side 38 and the outer wall 28b of the tubular body 22, over the length of the splitter vane 30 between its leading and trailing edges 32,34. This divergent flow passage 39 diverges or becomes larger in cross-sectional area over the length of the splitter vane 30 because its cross-sectional area increases from the inlet of the divergent flow passage 39 to its outlet (i.e. defined at the leading edge 32 and the trailing edge 34 of the splitter vane 30).

The convergent passage 37 formed by the splitter vane 30 therefore effectively forms a nozzle, whereby fluid flow within the convergent passage 37 is accelerated therethrough in the direction of flow. On the opposite side of the splitter vane 30, however, fluid is diffused through the divergent flow passage 39 in the direction of flow. Accordingly, the splitter vane 30 splits the main fluid flow F within the internal fluid passage 29 upstream of the splitter vane 30 into two separate streams, one on each side of the splitter vane 30. The stream within the convergent passage 37 formed on one side of the splitter vane 30 is accelerated, whereas the stream within the divergent passage 39 on the opposite side of the splitter vane 30 is decelerated. As seen in the embodiment of FIG. 3, the size (i.e. in cross-sectional area) of the convergent passage 37 is however small than that of the divergent passage 39. It can thus be appreciated that "converging fluid flow" is understood herein to refer to accelerating fluid flow through a narrowing passage (namely the convergent passage 37) on one side of the splitter vane 30. While the overall effect of the diffuser pipe 20 is to diffuse, and thus decelerate the flow F flowing therethrough, the acceleration of the smaller fluid flow stream within the convergent flow passage 37, defined by the splitter vane 30, is thought to enhance the ability of fluid flow ability to remain attached downstream of the bend 28 in the diffuser pipe 20. This accelerated fluid flow may also help to encourage, or "bias", upstream fluid flow towards the convergent flow passage 37.

Similarly, "diffusing fluid flow" is understood herein to refer to increasing a static pressure of fluid flow through the broadening divergent passage 39 on the opposite side of the splitter vane 30 to the convergent passage 37. Additional diffusion is understood to occur in the divergent flow passage 39 of each diffuser pipe 20. The airfoil-shaped splitter vane 30 therefore defines a pressure side at its first side 36, and a suction side at its second side 38. Structurally, the splitter vane 30 may also act as a stiffener and help to strengthen diffuser pipe 20. Splitter vane 30 can thus be used to replace traditional stiffening ribs that are sometimes stamped on the wall of diffuser pipes.

Referring now to FIGS. 4 and 5, the splitter vane 30 may extend across the diffuser pipe 20 between its inner opposed side walls, or wall-to-wall. This embodiment of the splitter vane 30 divides at least part of the curved portion 28 into two separate convergent and divergent flow passages 37,39. In the embodiment shown, the leading edge 32 of the splitter vane 30 is disposed at a lateral midpoint between opposed inner and outer walls 28a,28b, i.e. halfway across the bend of the diffuser pipe 20. In order to define the convergent and divergent flow passages 37,39, the trailing edge 34 of the splitter vane 30 is positioned closer to the inner wall 28a than to the outer wall 28b.

Referring now to FIGS. 6 and 7, each diffuser pipe 120 may also have an air recirculation conduit 40. The air recirculation conduit 40 is configured to supply a compressible fluid (e.g. air) to each of the diffuser pipes 120. It is known that the main gas flow in the diffuser pipes 120 can experience an adverse pressure gradient in the direction of flow F. This pressure gradient coupled with existing friction forces in the boundary layer of the wall of the diffuser pipes 120 can strengthen the effect of deceleration experienced by the main gas flow, which may result in the boundary layer being built up within the diffuser pipe 120. This buildup leads to increased flow blockage, diminishes pressure recovery, and can eventually lead to flow separation.

By recirculating the compressible air into the diffuser pipes 120 at a suitable location, it may be possible to prevent and/or reduce increased blockage and flow separation by energizing the boundary layer along the walls of the diffuser pipes 120. Flow with momentum deficit at the walls is replaced with high momentum flow, making the main fluid flow more resistant to flow separation. Another possible benefit may be that the recirculated compressible air helps to keep the main fluid flow attached to the walls. Each air recirculation conduit 40 draws the air from a supply 42 of pressurized air. Each air recirculation conduit 40 extends between a conduit inlet 44 which draws air from the supply 42, and a conduit outlet 46 which communicates with a corresponding diffuser pipe 120 to introduce the pressurized air into the diffuser pipe 120.

The supply 42 can be any source of the compressible air. The compressible fluid from this supply 42 can be actively provided, meaning that it can be pumped or otherwise actively directed to each air recirculation conduit 40. Alternatively, the supply 42 can simply be a region of higher pressure air within the compressor or downstream thereof. For example, the supply 42 of compressible air can be the region downstream of the outlets of the diffuser pipes 120 and adjacent to an inlet of the combustor. This area will generally be filled with combustion chamber inlet air, or so-called "P3" air. Therefore, the compressible fluid injected into the diffuser pipes 120 via the air recirculation conduits 40 can be P3 air. In such a configuration, the P3 compressible fluid can recirculate passively toward the air recirculation conduits 40 because the static pressure at the supply 42 is typically greater than the static pressure at the location of the air recirculation conduits 40. Such a passive circulation system can be more easily implemented in existing diffusers. In most embodiments, the compressible fluid is the same as the fluid of the main fluid flow.

It can thus be appreciated that each air recirculation conduit 40 can be a pipe or duct, or can alternatively be a bore, orifice, or slot in the wall of a corresponding diffuser pipe 120. The conduit outlet 46 opens into, and is in fluid communication with, a corresponding diffuser pipe 120. Each conduit outlet 46 can be an recirculation slot or hole extending through the wall or the diffuser pipe 120. The conduit outlet 46 may open into the diffuser pipe 120 at a point upstream of the splitter vane 30, so that the air recirculation conduit 40 can recirculate the compressible fluid into the diffuser pipe 120 at a location upstream of the splitter vane 30. Indeed, the conduit outlet 46 and air recirculation conduit 40 may recirculate air directly into the convergent flow passage 37. The converging/diverging configuration within the diffuser pipe 30, which is created by the presence of the splitter vane 30, as well as the upstream air recirculation conduit 40, help to create an "air ejector" effect within the diffuser pipe 20.

It is contemplated that by locating the conduit outlet 46 upstream of the splitter vane 30, the compressible fluid exiting the air recirculation conduit 40 may energize the boundary layer of the main fluid flow in the diffuser pipe 120 so as to reduce or prevent any flow separation. The recirculated air may prevent flow blockage and flow separation by energizing the boundary layer at the walls 28a,28b of the diffuser pipe 120. Flow with a momentum deficit at the walls 28a,28b is replaced with a higher momentum flow, making the fluid flow more resistant to flow separation. It is believed that such a reduction in flow separation can reduce the mixing losses in the diffuser pipe 120, improve the overall efficiency and range of the compressor, and improve the operability of the front stages of the gas turbine engine.

The number of conduit outlets 46 that an air recirculation conduit 40 has may be greater than one, such that the air recirculation conduit 40 can recirculate the compressible fluid into the diffuser pipe 120 at multiple locations on the diffuser pipe 120.

Referring to FIG. 3, there is also disclosed a method for diffusing fluid flow. The method includes conveying fluid flow through a diverging tubular body 22.

The method also includes splitting fluid flow at the curved portion 28 of the tubular body 22 so as to divide fluid flow between a first convergent fluid passage 37, and a second fluid passage 39. Fluid flow is converged in the first fluid passage 37, and may be diffused in the second fluid passage 39.

Because of the diffusion process, the diffuser pipes 20,120 experience adverse pressure gradients in the direction of flow F, with end wall boundary layer being built up as the result. The buildup may lead to increased blockage, diminished pressure recovery and eventually lead to flow separation. The flow separation usually starts at the diffuser bend 28 where the curvature is at its maximum. The splitter vane(s) 30 may reduce pressure gradient across the curved portion 28 and help the flow F to negotiate the tight turn more efficiently. The airfoil splitter vanes 30 described herein may also facilitate swirl removal. Computational fluid models can be used to optimize the splitter vane 30 length and/or location, while the inner and outer walls 28a, 28b, can be shaped in accordance with the splitter vane 30 to best conform to a stator pitch.

The diffuser pipes 20,120 with splitter vane(s) 30 at the curved portions 28 thereof may limit flow separation and/or reduce the likelihood of it initiating. Since mixing losses may be a prominent contributor to diffuser pipe loss and is initiated mostly at the curved portion 28, employing splitter vane(s) 30 at that location may be more effective than anywhere else in the diffuser pipe 20.

Although the embodiments described above include only a single splitter vane 30, it is to be understood that the diffuser pipe 20 as described herein may in fact include two or more such splitter vanes 30, configured as required to form several different converging flow passages 37, etc. within the confines of the larger diffusing fluid flow passage 29 of the diffuser pipe 20. This may be desirable, for example, in the case where the diffuser pipe 20 has several different bends 28 in it, in which case it a splitter vane 30 may be disposed within the internal fluid passage proximate each of the bends, in order to form a convergent passage 37 near the bends which locally accelerates the flow to reduce the likelihood of occurrence of flow separation at or downstream of the bend.

The above description is meant to be exemplary only, and one skilled in the art will recognize that changes may be made to the embodiments described without departing from the scope of the invention disclosed. Other modifications which fall within the scope of the present invention will be apparent to those skilled in the art, in light of a review of this disclosure, and such modifications are intended to fall within the appended claims.

The invention claimed is:

1. A compressor diffuser for a gas turbine engine comprising:
    at least one diffuser pipe having a tubular body defining an internal flow passage extending therethrough, the tubular body including a first portion extending in a first direction, a second portion extending in a second direction different from the first direction, and a curved portion fluidly linking the first portion and the second portion, the at least one diffuser pipe having an air recirculation conduit extending between a conduit inlet configured to receive a flow of compressed air from a supply, and a conduit outlet communicating with the internal flow passage to introduce air therein, the supply disposed downstream of the at least one diffuser pipe in a region of the compressor having combustion chamber inlet air, the combustion chamber inlet air having a static pressure greater than a static pressure of air at the conduit inlet of the recirculation conduit, the combustion chamber inlet air circulating passively from the supply to the conduit inlet of the recirculation conduit; and
    a splitter vane disposed within the internal flow passage of the curved portion of the tubular body, the splitter vane defining a convergent flow passage between itself and a radially inner wall of the curved portion.

2. The compressor diffuser of claim 1, wherein the splitter vane defines a divergent flow passage between itself and a radially outer wall of the curved portion.

3. The compressor diffuser of claim 1, wherein the recirculation conduit fluidly links an area downstream of the splitter vane with an area upstream of a trailing edge of the splitter vane.

4. The compressor diffuser of claim 1, wherein the conduit outlet of the recirculation conduit opens into the internal flow passage upstream of the splitter vane.

5. The compressor diffuser of claim 1, wherein the splitter vane extends between opposed inner side walls of the curved portion across the internal flow passage.

6. A method for diffusing fluid flow in a compressor, comprising:
    conveying fluid flow through a diverging internal flow passage of a compressor diffuser, the internal flow passage including at least one curved portion;
    splitting the fluid flow into first and second fluid passages defined within the internal flow passage, the first and second fluid passages being at least partially located within the curved portion;
    converging fluid flow through the first fluid passage; and
    recirculating additional air into the conveyed fluid flow within the internal flow passage by passively recirculating compressed air from a supply of combustor inlet air downstream of the first fluid passage.

7. The method of claim 6, further comprising diffusing fluid flow through the second fluid passage.

8. The method of claim 6, wherein converging fluid flow includes reducing a cross-sectional area of the first fluid passage along a length thereof.

9. The method of claim 8, wherein diffusing fluid flow includes increasing a cross-sectional area of the second fluid passage along a length thereof.

10. The method of claim 6, wherein recirculating additional air comprises recirculating the additional air into the first fluid passage.

11. The method of claim 6, wherein recirculating additional air includes recirculating air into the internal flow passage upstream of splitting fluid flow.

12. A centrifugal compressor, comprising:
    an impeller having an inner hub with a plurality of vanes extending therefrom, the impeller being rotatable within an outer shroud about a central longitudinal axis, the impeller having a radial impeller outlet; and
    a diffuser configured to diffuse gas received from the impeller outlet, the diffuser comprising:
        at least one diffuser pipe having a tubular body defining a flow passage extending therethrough, the tubular body including a first portion extending in a first direction, a second portion extending in a second direction different from the first direction, and a curved portion fluidly linking the first portion and the second portion, the at least one diffuser pipe having an air recirculation conduit extending between a conduit inlet configured to receive a flow of compressed air from a supply, and a conduit outlet communicating with the internal flow passage to introduce air therein, the supply disposed downstream of the at least one diffuser pipe in a region of the compressor having combustion chamber inlet air, the combustion chamber inlet air having a static pressure greater than a static pressure of air at the conduit inlet of the recirculation conduit, the combustion chamber inlet air circulating passively from the supply to the conduit inlet of the recirculation conduit; and
        a splitter vane disposed within the internal flow passage of the curved portion of the tubular body, the splitter vane defining a convergent flow passage between itself and a radially inner wall of the curved portion.

13. The centrifugal compressor of claim 12, wherein the splitter vane defines a divergent flow passage between itself and a radially outer wall of the curved portion.

14. The centrifugal compressor of claim 12, wherein the conduit outlet of the air recirculation conduit opens into the at least one diffuser pipe upstream of the splitter vane.

* * * * *